(12) United States Patent
Bansal et al.

(10) Patent No.: US 8,483,773 B2
(45) Date of Patent: Jul. 9, 2013

(54) TELEPHONE RING EXTENDER SYSTEM AND METHOD

(75) Inventors: Ravi P. Bansal, Tampa, FL (US); Martinianus B. Hadinata, Zurich (CH); Charles S. Lingafelt, Durham, NC (US); John E. Moore, Jr., Brownsburg, IN (US); Brian M. O'Connell, Rochester, MN (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/203,215

(22) Filed: Sep. 3, 2008

(65) Prior Publication Data

US 2010/0056226 A1      Mar. 4, 2010

(51) Int. Cl.
*H04B 1/38*      (2006.01)

(52) U.S. Cl.
USPC .................... 455/567; 455/414.1; 455/418

(58) Field of Classification Search
USPC ........................................................ 455/567
See application file for complete search history.

(56) References Cited

U.S. PATENT DOCUMENTS

| | | | |
|---|---|---|---|
| 5,394,445 A * | 2/1995 | Ball et al. ................ | 379/88.21 |
| 5,872,834 A | 2/1999 | Teitelbaum | |
| 6,026,152 A * | 2/2000 | Cannon et al. ............ | 379/142.06 |
| 6,374,145 B1 * | 4/2002 | Lignoul ..................... | 700/17 |
| 6,542,073 B2 * | 4/2003 | Yeh et al. .................. | 340/440 |
| 6,842,505 B1 | 1/2005 | Suder et al. | |
| 7,042,342 B2 * | 5/2006 | Luo et al. .................. | 340/426.17 |
| 7,120,238 B1 | 10/2006 | Bednarz et al. | |
| 7,827,000 B2 * | 11/2010 | Stirling et al. ............ | 702/141 |
| 2004/0127198 A1 * | 7/2004 | Roskind et al. ........... | 455/412.2 |
| 2005/0064913 A1 * | 3/2005 | Kim .......................... | 455/567 |
| 2005/0232405 A1 | 10/2005 | Gaskill | |
| 2006/0050864 A1 * | 3/2006 | Shaffer et al. ............. | 379/265.02 |
| 2007/0026850 A1 * | 2/2007 | Keohane et al. ........... | 455/418 |
| 2007/0036286 A1 * | 2/2007 | Champlin et al. ......... | 379/67.1 |
| 2007/0213100 A1 * | 9/2007 | Osann, Jr. ................. | 455/567 |
| 2007/0288157 A1 * | 12/2007 | Peterman ................... | 701/207 |
| 2008/0032704 A1 * | 2/2008 | O'Neil et al. .............. | 455/456.1 |
| 2008/0037743 A1 * | 2/2008 | Bishop ...................... | 379/201.01 |
| 2008/0037754 A1 * | 2/2008 | Bishop ...................... | 379/215.01 |
| 2009/0088138 A1 * | 4/2009 | Jung et al. ................. | 455/414.1 |
| 2009/0088207 A1 * | 4/2009 | Sweeney et al. ........... | 455/557 |

* cited by examiner

*Primary Examiner* — Jinsong Hu
*Assistant Examiner* — Magdi Elhag
(74) *Attorney, Agent, or Firm* — Yudell Isidore Ng Russell PLLC

(57) ABSTRACT

A system and method to extend a ring of a telephone using presence detection of a user of a telecommunication device, and/or motion detection of a mobile telecommunication device. Presence detection and a ring control system are used to extend the ring of the telecommunication device based on user presence senor detection output signals and user preferences. Device motion detection and a ring control system are used to extend the ring of the mobile telecommunication device based on device motion detection output signals and user preferences.

12 Claims, 5 Drawing Sheets

US 8,483,773 B2

TELEPHONE RING EXTENDER SYSTEM AND METHOD

BACKGROUND OF THE INVENTION

1. Technical Field

The present invention generally relates to telecommunication networks and in particular relates to an improved telephone ring extender system and method to extend a ring of a telephone using user presence and/or device motion detection.

2. Description of the Related Art

Currently, when a telephone is inactive (on hook), its bell, beeper, flasher or other alerting device is connected across a telephone line to a public switched telephone network (PSTN) through a capacitor. The inactive phone does not short the line, thus a telephone exchange of the PSTN detects that the telephone is on hook, and only the bell is electrically connected. When someone places an incoming call to the telephone, the telephone exchange applies a high voltage pulsating signal, which causes a sound producing device within the telephone to ring, beep or otherwise audibly alert the called party. When a user picks up the telephone handset, switchhook circuitry disconnects the bell, connects the voice circuitry of the telephone, and puts a resistance short on the line, confining that the phone has been answered and is active. The parties are thereby connected and may converse via the voice circuitry of their respective telephones.

It is common for a person to be within the physical proximity of a ringing telephone, yet be unable to answer the telephone before the incoming call is transferred to a voice mail system or answering machine, for a variety of reasons. For example, the person may be engaged in activities away from the telephone. Commonly, telephone services are configured to switch to a voice mail system or an answering machine after a preset (default) number of rings, and by the time the person reaches the telephone, the set number of rings has occurred and the incoming call has been transferred to the answering machine or voice mail. The person thereby loses the opportunity to answer the incoming call, or in some cases has to interrupt a caller's message being provided to the voice mail or answering machine while in progress, which is undesirable.

SUMMARY OF THE INVENTION

Disclosed are a system and method to extend a ring of a telephone using presence detection of a user of a telecommunication device, and/or motion detection of a mobile telecommunication device. Presence detection and a ring control system are used to extend the ring of the telecommunication device based on user presence sensor detection output signals and user preferences. Device motion detection and a ring control system are used to extend the ring of the mobile telecommunication device based on device motion detection output signals and user preferences.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
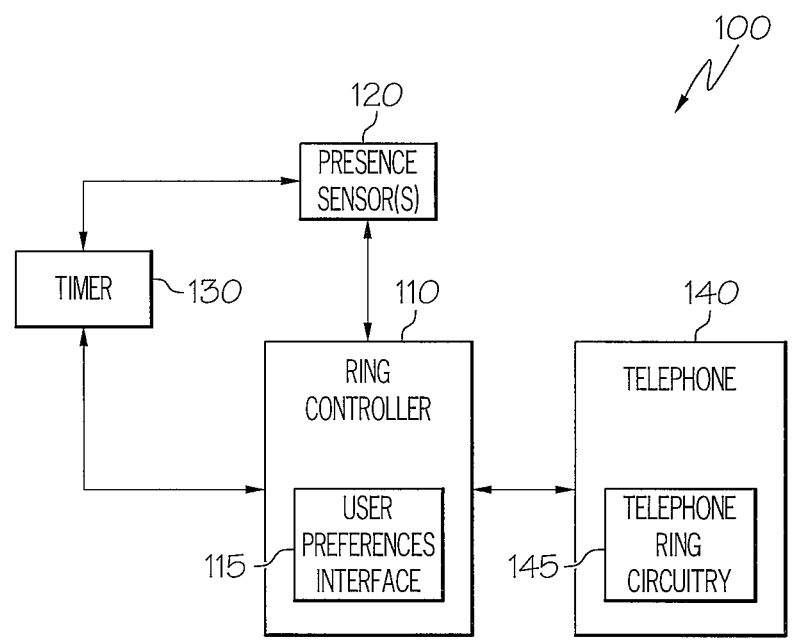
FIG. 1 depicts a high level block diagram of an embodiment of a ring control system having presence sensors, according to the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures. The specific reference numerals assigned to the elements are provided solely to aid in the description and not meant to imply any limitations (structural or functional) on the present invention.

The present invention provides a system and method to extend a ring of a telephone using presence detection of a user of a telecommunication device, and/or motion detection of a mobile telecommunication device. Presence detection and a ring control system are used to extend the ring of the telecommunication device based on user presence senor detection output signals and user preferences. Device motion detection and a ring control system are used to extend the ring of the mobile telecommunication device based on device motion detection output signals and user preferences.

Referring to FIG. 1, there is depicted a block diagram of an embodiment of a telephone ring control system (RCS) 100 of the present invention. The RCS 100 includes a call alert controller 110, which may be a ring controller, to control call alerts (e.g., telephone rings) provided to the telephone 140, and may be a computer, a processor, or other data processing device, which is connected to a telephone 140, which may be stationary at the time of the incoming call. The ring controller 110 may be physically located in proximity to the telephone 140, or may be provided within a telephone network of a telephone service provider selected by the user. Telephone 140 includes telephone ring circuitry 145 to control a ringer, beeper or other sound producing device (not illustrated), and/or a flashing light (not illustrated), or other perceptible signal used to provide an incoming call alert to notify a user of telephone 140 that an incoming call is present. Telephone 140 also includes circuitry (not illustrated) to perform switchhook functions which place the telephone in an "on hook" or "off hook" condition, and circuitry (not illustrated) to perform voice functions for communication between a telephone of the caller and a user of the telephone 140 during a call.

The ring controller 110 is connected by a wired or wireless connection, using known methods, to a presence sensor 120, a timer 130 and includes a user preferences interface 115. The user preferences interface 115 may also be a separate device, in another embodiment. The presence sensor 120, described below in greater detail, includes one or more individual sensors which provide a presence detect signal to the ring controller 110 to indicate the actual presence, or recent presence, of a potential user of telephone 140 within a house, an office building, or other multi-room environment. The presence detect signal output from the presence sensor 120 is used by the ring controller 110 to control whether the number of rings of the telephone 140 should be extended when a call is placed to telephone 140. The present invention may utilize radio frequency (RF) signaling, power line signaling, or other known network signaling technology, such as a unified messaging technology available from telephony service providers, to provide the presence detect signal to the ring controller 110.

A timer 130 is connected to the ring controller 110 and the presence sensor 120. The timer 130 may be a separate device, as depicted in FIG. 1, or may be integrated, in another embodiment, with the ring controller 110. A user of telephone 140 enters user preference information via the telephone 140 to be provided to the user preferences interface 115 of the ring controller 110, such as, for example, an extended ring value to indicate how many rings the ring controller 110 should provide to the telephone 140 for an incoming call when, during an incoming call, the user's presence is detected by a presence sensor 120, or, for example, to set the timer 130 with a timeout count value (for example, 30 minutes). The extended ring value is greater than a default ring count value which is used when the ring extender function has not been selected by the user of telephone 140 for incoming calls.

Regarding the timeout count value, after the user terminates a call previously received on the telephone 140, a timeout count begins in the timer 130. When a new incoming call is received while the timeout count is counting down in the timer 130, even if a presence sensor 120 does not detect an actual presence of a potential user of telephone 140, if the timeout count has not yet been reached, the ring controller 110 extends the number of rings of the telephone 140 to the number of rings indicated by the extended ring value before automatically switching the incoming call to voice mail.

Figure 2:
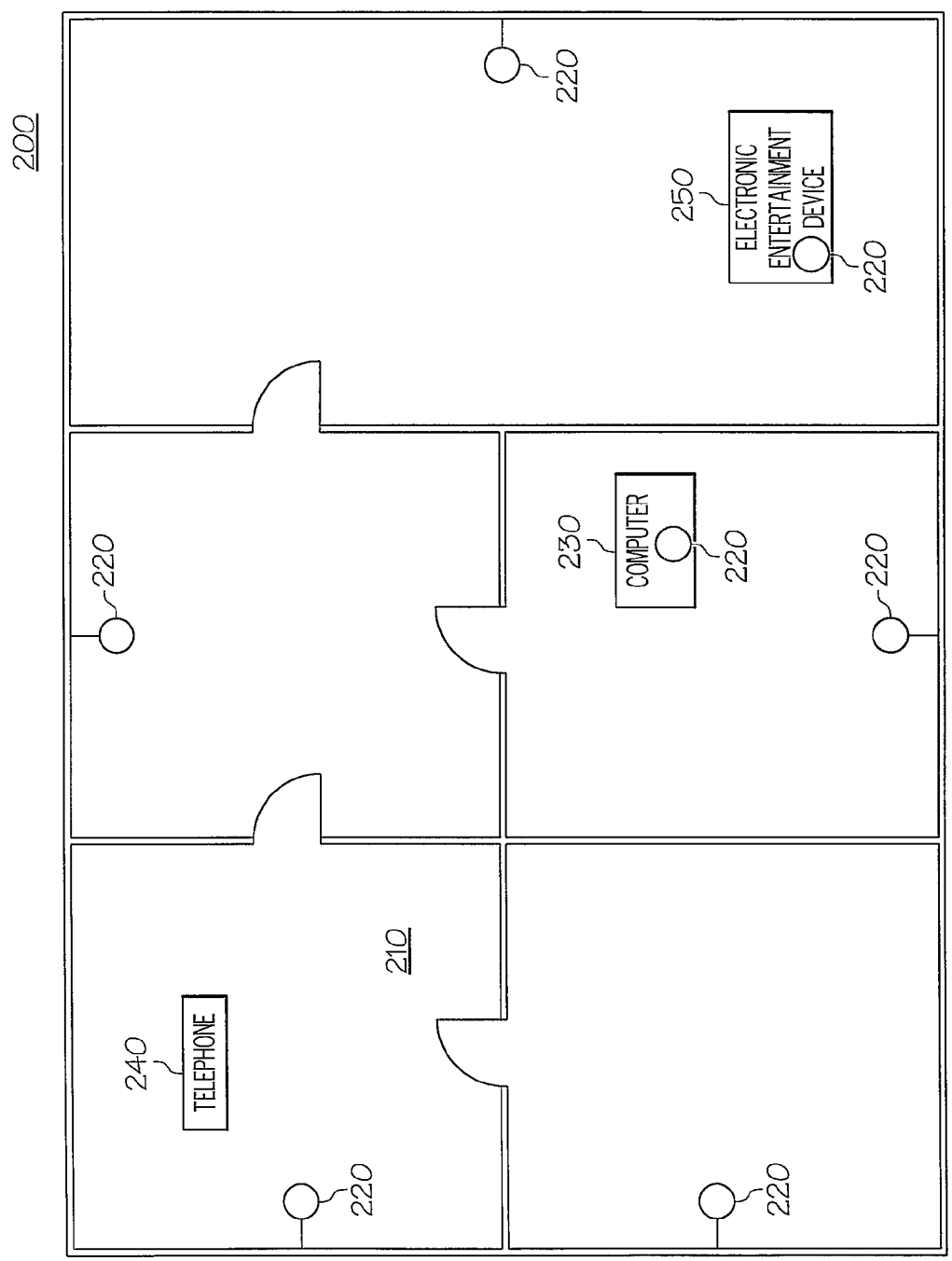
FIG. 2 is a diagram of an embodiment of a multi-room environment having presence sensors, according to the present invention.

Referring to FIG. 2, there is depicted a diagram of an embodiment of the present invention of a multi-room environment 200 which includes a plurality of rooms 210, a plurality of presence sensors 220 such that one or more presence senor 220 is physically located in one or more of the rooms 210. The presence sensors 220 may be configured as a motion detector to detect a motion of a potential telephone user within the multi-room environment 200, an infra-red (IR) presence detector to detect heat of a person within the multi-room environment 200, a light switch actuation sensor to detect when a light fixture or lamp (not illustrated) is turned on/off, or dimmed, via a light switch within the multi-room environment 200.

Additionally, a computer 230 may be located within a room 210 of the environment 200 and may include a presence sensor 220 configured as a computer use sensor to sense present use of the computer, such as an input command entered by a computer user via a computer mouse (not illustrated) or keyboard (not illustrated) of the computer 230 causing a computer use signal to be provided to the ring controller 110 by the presence sensor 220 configured as a computer use sensor. Such a computer use sensor may be functionally integrated into the operating system or hardware of the computer 230, or may be a separate add-on device disposed within a Universal Serial Bus (USB) port or a PCMCIA slot of the computer 230, and would send a presence detect signal configured as a computer use signal to the ring controller 110 of FIG. 1 using known methods. Any of these configurations of the presence sensors 220 would send a presence detect signal to the ring controller 110 of FIG. 1, using known methods, to indicate that a potential user of the telephone 240 is located in a room 210 of the multi-room environment 200.

Software may be installed on computer 230 to detect usage and presence of a user and to transmit a presence detect signal to the ring controller 110, using known technology and standards, such as TCP/IP or Bluetooth®, through an add-on card as described above. If multiple computational devices, such as computers, PDA devices, etc. are present within the environment 200, the software could be installed on each of the computational devices and a signal from any of the computational devices would indicate the presence of a potential telephone user.

If the computational device is a portable electronic device, such as a laptop computer or a PDA device, the portable electronic device may include software and/or circuitry to detect when the portable electronic device is not physically located within the environment 200, using either Global Positioning Satellite (GPS) or subnet profiles, and would not provide a presence detect signal since its user is not a potential user of telephone 240 in such a scenario since the potential user of telephone 240 is not physically located within the environment 200.

The telephone 240, or the telephone system of the service provider to which telephone 240 is connected, may include a presence sensor 220 configured as a telephone usage device or software. Such telephone usage devices/software are known in the art to detect telephone usage by measuring voltages applied to the telephone line, which increase during usage of the telephone 240. Since it is reasonable to assume that a user of the telephone 240 may remain within the environment 200 for a certain time period after a call is completed, the timer 130 of FIG. 1 may be set, as described above, to a timeout count after termination of usage of the telephone 240 is detected by such a telephone usage device.

Present use of the telephone 240 by a user which is detected by the telephone usage device may also be used to extend, or increase, the number of rings before the RCS 100 switches the incoming call over to voice mail, for example where an incoming call can be detected by a present user of the telephone 240 (audibly or otherwise) while on a present call, and the present user can then choose to end the present call and pickup the incoming call before the incoming call is switched to voice mail.

Electronic entertainment device 250, which is located in a room 210, may be configured as a television, a home stereo system, a home theater system, a personal video recorder (PVR), or the like, or as a remote control device for any such configurations. The electronic entertainment device 250 may also be configured as a video game console, or other electronic game component. In another embodiment, the electronic entertainment device 250 may be configured as a mobile telecommunication device, as described below. A presence sensor 220 may be incorporated in any of such configured electronic entertainment device 250 to detect a user command, such as a volume up/down command, a channel change command, or any user input command for the electronic entertainment device 250, to provide a presence detect signal to the ring controller 110 to indicate a potential telephone user is physically located within the environment 200.

One or more of the presence sensors 220 may be configured as an electronic frequency sensor to detect the presence of radio transmission signals being emitted from the electronic entertainment device 250, which is configured as a mobile telecommunication device, as described above, such as a cell phone, a PDA, or a Blackberry®-type device, within one or more telecommunication frequency bands where the mobile telecommunication device is being used by a user within the environment 200. For these types of configurations of the electronic entertainment device 250 as a mobile telecommunication device, it is not necessary that the informational content of electronic signals emitted from the mobile telecommunication device be decoded, but simply that a presence sensor 220 configured as a electronic frequency sensor would detect the signals being emitted within one or more known telecommunication frequency bands and provide a presence detect signal to the ring controller 110 to indicate that a potential user of the telephone 140 is physically located within the environment 200.

Additionally, a determination may be made by the presence sensor 220 of power of the radio transmission signals emitted by the electronic entertainment device 250, which is configured as a mobile telecommunication device, using passive techniques to detect the power, or signal strength (e.g., intensity, amplitude), of the mobile telecommunication device's transmitted signals, and when the power is determined to be greater than a predetermined threshold value, the presence detect signal may be provided by the presence sensor 220 to the ring controller 110 to indicate the close physical proximity to the telephone 240 of the user of mobile telecommunication device.

Furthermore, a potential user of telephone 240 could register the unique identification (ID) signal of the electronic entertainment device 250, which is configured as a mobile telecommunication device, with telephone RCS 100 and when the ID signal is detected by the presence sensor 220, the RCS 100 would automatically receive a presence detect signal provided by the presence sensor 220 to indicate that a potential telephone user is present within the environment 200.

A radio frequency (RF) tag could be incorporated into clothing, or a portable electronic device (for example, a wrist watch, portable wireless telephone, a wireless phone, a PDA, etc.) of a person located within the environment 200. A presence sensor 220 could be configured as an RF tag reader to detect the physical presence of such an RF tag and to provide a presence detect signal to the ring controller 110 to indicate that a potential telephone user is physically located within the environment 200.

It should be understood that any combination of the above-described configured presence sensors 220 can be used in the present invention to provide a presence detect signal to the RCS 100 to indicate that a potential telephone user is physically located within the environment 200. Other techniques and electronic devices may be used, such as an electronic calendar, door motion sensors, security alarm system integration, voice recognition (such as the ability for a potential telephone user to speak a command such as, "I'll get it", "Wait", etc.) to provide the presence detect signal, as well.

Referring again to FIG. 1, as described above, the RCS 100 controls the number of rings (incoming call alerts) of the telephone 140 in response to one or more settings entered by a user in the user preferences interface 115 to indicate, among other things, an extended ring value which is greater than the default ring count value. The extended ring value may be provided by the user directly to a provider of voicemail services used by the user of telephone 140 for incoming calls which are not answered by the user within the extended ring value, or the default ring count, depending, respectively, on whether or not the ring extender function of the ring controller 110 has been activated by the user. The user may enter the settings within a user profile of the voicemail service provider to modify the user profile to control the number of rings of the telephone 140. The methods to enter the extended ring value and the types of voicemail ring control methods and voicemail providers described below are non-exhaustive, and other non-described, but known, types of ring control methods and voicemail providers may also be used with the present RCS 100.

Dual-Tone Multi-Frequency (DTMF)—For this type of ring control method, the voicemail provider is commonly a telephone service provider, and, in general, an agreement may be reached between voicemail providers and service providers for service providers to forward DTMF command signals to the voicemail provider to control the ring of the telephone 140. When a telephone user desires to manually set an extended ring count, the RCS 100 opens a phone line (not illustrated) which is connected to the telephone 140 to receive a dial tone, and generates DTMF tones (key press tones) which may be used by the RCS 100 to modify the telephone user's voicemail profile stored within the user preferences interface 115. For example, for ring control for some telephone services, dialing "*78" may set the ring count to 8, where the combination of input symbols "*7" indicates that the user is changing the ring count, and a number input by the user following the symbol "*7" indicates the extended ring count value. Telephone service providers may use different combinations of DTMF tones, that is, other input symbols, may be used by the user to input the extended ring value for the telephone 140. Therefore, the RCS 100 may include stored profiles within the user preferences interface 115 for various telephone service providers and the user may configure the RCS 100 to indicate which telephone service provider is being used to provide the voicemail services so that the user will know the proper format of symbols to use to input the extended ring value.

Service Provider Website—This method allows a user to input the extended ring value, via the Internet, to a voicemail services provider. The voicemail services provider website may request modification of a user's ring count profile within a user profile through an automated completion by the user of a web form and a web session, or by using other web services technology. Such methods are known in the art of automating web requests. Voicemail service providers will likely have different web site addresses, web forms, voicemail services and configurations, and therefore, the user preferences interface 115 of the ring controller 110 of the present invention may include profiles of various voicemail service providers which may be used by a user of telephone 140. Additionally, the user may configure the user preferences interface 115 of the RCS 100 to indicate which service provider they are presently using, the applicable username, password and other account information, via the internet.

Local Voicemail System—The voicemail system used by RCS 100 may not be operated by a telephone service provider or other third party voicemail provider and may instead be a physical device (not illustrated) located within the multi-room environment 200 of FIG. 2 and connected to the telephone 240, or may be incorporated within the telephone 240. Such a local voicemail system may include software and/or hardware to receive commands from the RCS 100 to allow a user to input the extended ring value in a user's ring profile stored within the local voicemail system. Commands to/from the local voicemail system and the RCS 100 may be transmitted via radio waves, or via other known methods.

The RCS 100 may be manually activated or deactivated. In addition, once enabled, the RCS 100 may be disabled by a user if the user desires that an incoming call is to be transferred to voicemail service or an answering machine after the default number of rings, despite the presence sensors 120 detecting the user's presence. The present invention enables a telephone user flexibility to answer calls while providing an option of having incoming calls being transferred directly to voicemail after a default, or an extended, number of rings.

The RCS 100 may extend the number of rings of the telephone 140 and provide a message to notify a caller after an incoming call is placed to the telephone 140 to please wait and that the user of telephone 140 is presently unavailable and is on another call and that the user may be able to answer the phone shortly. If the RCS 100 receives no presence sensor detect signal, it may also have the ability to decrease the number of rings prior to transferring the incoming call to the answering machine or voice mail service, so that callers do not have to wait for the default number of rings to leave a message.

Figure 3:
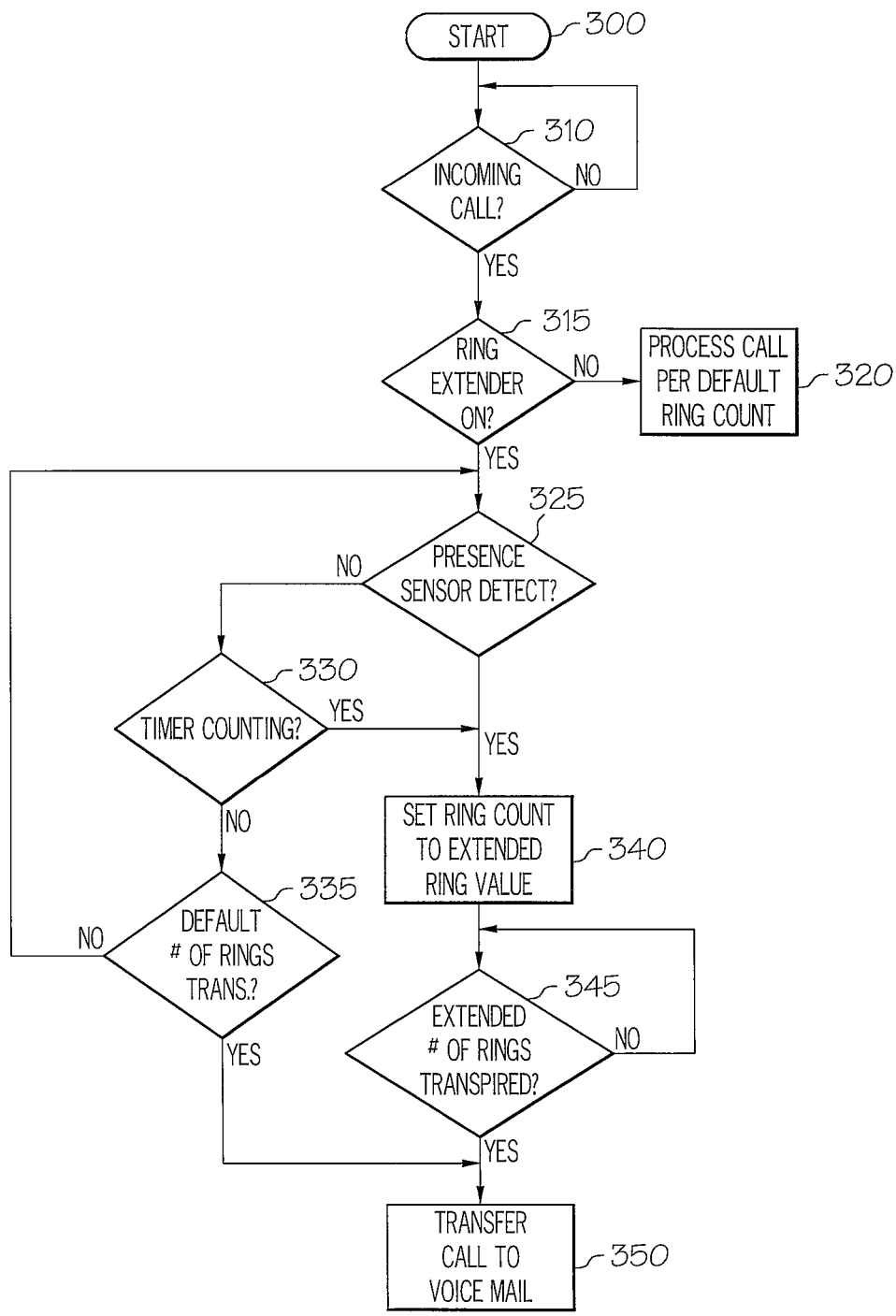
FIG. 3 is a high level logical flowchart of an embodiment of a method of controlling the ring control system of FIG. 1, according to the present invention.

Referring to FIG. 3, there is illustrated an embodiment of a high level logical flowchart of a control method for the telephone RCS 100, according to the present invention. The control method for RCS 100 commences, and waits for an incoming call, respectively, at blocks 300 and 310. When an incoming call is received, a determination is made at block 315 as to whether the ring extender function is activated. Responsive to the ring extender function not being activated, the incoming call is processed as per the default ring count setting at block 320. Responsive to the ring extender function being activated, at block 325 a determination is made of whether there is a presence sensor detect signal. Responsive to it being determined that there is a presence detect signal, the ring count is set to be equal to the extended ring value at block 340.

Responsive to the determination at block 325 that there is no presence detect signal, a determination is made at block 330 as to whether the timer 130 is counting a predetermined timeout count. Responsive to a determination at block 330 that timer 130 not counting the timeout count, a determination is made at block 335 as to whether the default number of rings has transpired, and if so, control is passed to block 350 and the incoming call is transferred to voicemail. Responsive to the determination at block 335 that the default number of rings has not transpired, control is passed to block 325.

Responsive to a determination at block 325 that that there is a presence detect signal, control is passed to block 340 and the ring count is set to be equal to the extended ring value. Additionally, responsive to a determination at block 330 that timer 130 is still counting the timeout count, control is passed to block 340 and the ring count is set to be equal to the extended ring value. A determination is made at block 345 as to whether the number of rings equal to the extended ring value has transpired, and if so, at block 350 the incoming call is transferred to voicemail. Responsive to a determination at block 345 that the number of rings equal to the extended ring value has not yet transpired, RCS 100 waits at block 345 until the extended number of rings has transpired, and if so, control passes to block 350 where the incoming call is transferred to voicemail. If an incoming call is answered on telephone 140 at any time during the operation of the control method of FIG. 3, the control method is immediately terminated by the RCS 100.

Figure 4:
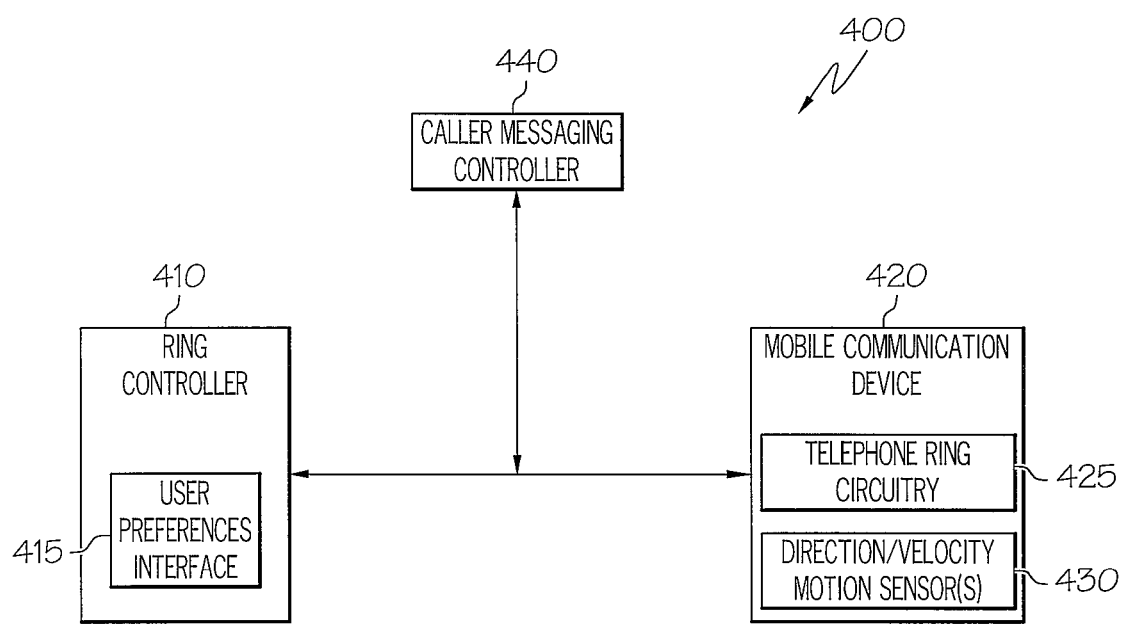
FIG. 4 depicts a high level block diagram of an embodiment of a ring control system having device motion sensors, according to the present invention.

Referring to FIG. 4, there is depicted a block diagram of another exemplary telephone ring control system (RCS) 400 of the present invention. The RCS 400 includes a ring controller 410, which may be a computer, processor, or other data processing device, which may be wirelessly connected to a mobile communication device 420 using known methods, or may be incorporated within the mobile communication device 420. The ring controller may also include a user preferences interface 415 similar to the user preferences interface 115 described above. If the ring controller 410 is a separate device, it may be provided by the telephone network of a telephone service provider selected by the user. The mobile communication device 420 may be a mobile telephone, a Blackberry®-type device, a laptop computer, or any other type of mobile electronic device which includes voice and/or text telecommunication functionality having a ringer system, or an equivalent incoming call alert system for a user of the mobile communication device 420. A call messaging controller 440, which may be incorporated within the ring controller 410, or may be included within the telephone network of a service provider selected by the user, is connected to the ring controller 410 and to the mobile communication device 420.

The mobile communication device 420 may include telephone ring circuitry 425 to control a ringer, beeper or other sound producing device (not illustrated), and/or a flashing light (not illustrated), or other perceptible signal used to provide an incoming call alert to notify a user of the mobile communication device 420 that an incoming call is present. The mobile communication device 420 may also include a direction/velocity motion sensor 430, which may have GPS circuitry/functionality/sensor, horizontal/vertical motion detection circuitry/functionality/sensor, and/or velocity detection circuitry/functionality/sensor.

The direction/velocity motion sensor 430 includes one or more individual sensors embedded in the mobile communication device 420 to provide a direction/velocity motion detect signal to the ring controller 410 if a detected motion is greater than a predetermined threshold value. For example, if a user of the mobile communication device 420 is traveling with the device mobile communication 420 in a motor vehicle or a train at a velocity which is greater than a predetermined threshold velocity, this type of motion is detected by the direction/velocity motion sensor 430 as an associated high velocity motion, and a direction/velocity motion detect signal is provided to the ring controller 410. Also, for example, if the user of the mobile communication device 420 is climbing/descending stairs, or riding in an elevator or escalator, and moves more than predetermined amount of change in elevation within a predetermined amount of time, this type of motion is detected by the direction/velocity motion sensor 430 as an associated change of elevation motion, and a direction/velocity motion detect signal is provided to the ring controller 410.

The direction/velocity motion detect signal provided by the direction/velocity motion sensor 430 may be used by the ring controller 410 to not ring the mobile communication device 420, but to instead immediately send the incoming call to voice mail. The direction/velocity motion detect signal may otherwise be used to extend the number of rings of the mobile communication device 420 to an extended ring count (call alert count) to allow the user more time to sense that the mobile communication device 420 is receiving an incoming call (e.g., if in vibrate mode) and to answer the call. Whether the direction/velocity motion detect signal is used by the ring controller 410 to not ring (user unavailable) or extend the number of rings (user available soon) depends on the user settings of the user preferences interface 415. The direction/velocity motion detect signal may also be provided by the mobile communication device 420 to the call messaging controller 440 to provide a message to a caller who has placed a call to the mobile communication device 420 that the user of the mobile communication device 420 is currently unavailable, and then causing the ring controller 410, or the telephone network of the selected service provider, to immediately switch the incoming call to voicemail without attempting to ring the mobile communication device 420.

Figure 5:
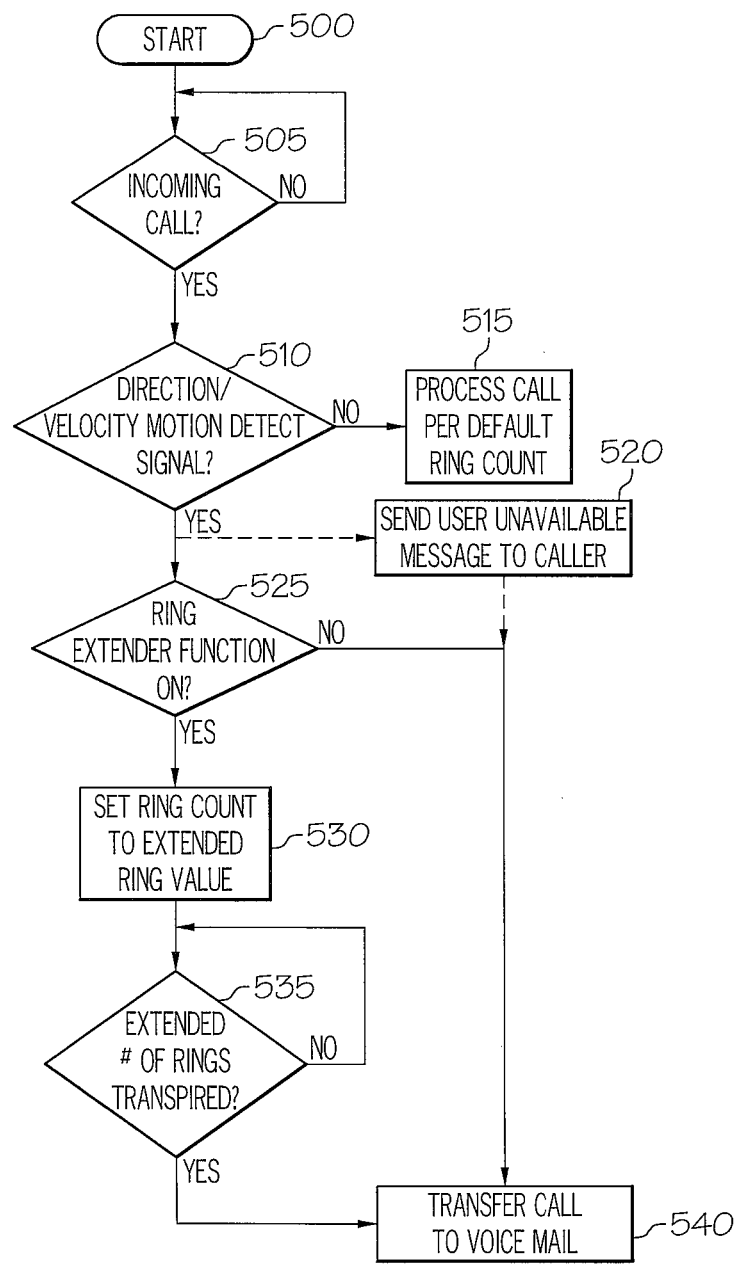
FIG. 5 is a high level logical flowchart of an embodiment of a method of controlling the ring control system of FIG. 4, according to the present invention.

Referring to FIG. 5, there is depicted a high level logical flowchart of another embodiment of a method of controlling the ring control system, according to the present invention. The RCS 400 waits for an incoming call at blocks 500 and 505. When an incoming call is received, a determination is made at block 510 as to whether a direction/velocity motion detect signal has been provided by the direction/velocity motion sensor 430. If not, the incoming call is processed as per the default ring count setting at block 515. If a direction/velocity motion detect signal has been provided by the direction/velocity motion sensor 430, a determination is made at block 525 as to whether the ring extender function is activated. If not activated, the incoming call is transferred to the user's voicemail at block 540. If the ring extender function is activated, at block 530 the ring count is set to be equal to the user selected extended ring value of the user preferences interface 415.

At block 535 a determination is made as to whether the extended number of rings has transpired. If so, the incoming call is transferred to voicemail at block 540. If not, the process waits at block 535 until the extended number of rings has transpired.

As an optional feature, if a determination is made at block 510 that a direction/velocity motion detect signal has been provided by the direction/velocity motion sensor 430, the caller is provided a message at block 520 to notify the caller that the user of the mobile communication device 420 to which the caller's incoming call has been placed is currently unavailable, and the incoming call is immediately transferred to voicemail at block 540 without first ringing the mobile communication device 420.

In the flow charts of FIGS. 3 and 5, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

It is understood that the use herein of specific names are for example only and not meant to imply any limitations on the invention. The invention may thus be implemented with different nomenclature/terminology and associated functionality utilized to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the present invention can also be embodied as programs defining functions in the present invention as computer-readable codes on a computer-readable medium. The computer-storage medium may be a computer-readable medium, which can include a computer-readable recording medium and/or a computer-readable transmission medium, and/or a computer-readable/writeable recording medium. The computer-readable recording medium is any data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices. The computer-readable recording medium can also be distributed over network coupled computer systems so that the computer-readable code is stored and executed in a distributed fashion. The computer-readable transmission medium can transmit data via a wired or wireless configuration (e.g., wired or wireless data transmission through the Internet). Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalent.

What is claimed is:

1. A method of controlling a call alert for an incoming call to a stationary personal telecommunication device, the method comprising:

determining whether a call alert extender function for the stationary personal telecommunication device is enabled for an incoming call to the stationary personal telecommunication device;

receiving, by a presence sensor, a user presence detect signal indicating that a potential user of the stationary personal telecommunication device is in physical proximity to the presence sensor, wherein the presence sensor and the stationary personal telecommunication device are physically separate, and wherein the receipt of the user presence detect signal indicates that the potential user requires an extended call alert count in order to reach the stationary personal telecommunication device prior to the personal telecommunication device switching to voicemail; and setting the extended call alert count associated with the call alert extender function for the mobile personal telecommunication device in response to the call alert extender function being enabled and user presence detect signal being received.

2. The method of claim 1, wherein receiving the user presence detect signal includes detecting the presence of a unique identification (ID) signal of a mobile telecommunications device in operation in proximity to the stationary telecommunication device.

3. The method of claim 1, wherein receiving the user presence detect signal includes detecting the presence of a computer use signal associated with present use of a computer in physical proximity to the stationary personal telecommunication device.

4. A call alert control system for handling an incoming call to a stationary personal telecommunication device, comprising:

a call alert controller, operatively connected to the stationary personal telecommunication device, that:

determines whether a call alert extender function for the stationary personal telecommunication device is enabled for an incoming call to the stationary personal telecommunication device;

receives, from a presence sensor, a user presence detect signal indicating that a potential user of the stationary personal telecommunication device is in physical proximity to the presence sensor, wherein the presence sensor and the stationary personal telecommunication device are physically separate, and wherein the receipt of the user presence detect signal indicates that the potential user requires an extended call alert count in order to reach the stationary personal telecommunication device prior to the personal telecommunication device switching to voicemail; and sets the extended call alert count associated with the call alert extender function for the mobile personal telecommunication device in response to the call alert extender function being enabled and user presence detect signal being received.

5. The call alert control system of claim 4, wherein the presence detect signal is provided by the at least one sensor in response to detecting the presence of a unique identification (ID) signal of a mobile telecommunications device in operation in proximity to the stationary telecommunication device.

6. The call alert control system of claim 4, wherein a caller of the incoming call is provided a message by a caller messaging controller, which is connected to the call alert controller, that a user of the personal telecommunication device is presently unavailable in response to a call alert extender function for the personal telecommunication device being enabled and the sensor detect signal being provided to the call alert controller by the at least one sensor.

7. The call alert control system of claim 4, wherein the incoming call to the personal telecommunication device is automatically sent to voice mail associated with the personal telecommunication device in response to transpiration of the predetermined number of call alerts provided to the personal telecommunication device.

8. The call alert control system of claim 4, wherein receiving the user presence detect signal includes detecting the presence of a unique identification (ID) signal of a mobile telecommunications device in operation in proximity to the stationary telecommunication device.

9. The call alert control system of claim 4, wherein receiving the user presence detect signal includes detecting the presence of a computer use signal associated with present use of a computer in physical proximity to the stationary personal telecommunication device.

10. A computer program product for controlling a call alert for an incoming call to the stationary personal telecommunication device, the computer program product comprising computer executable instructions stored on a computer readable storage medium, the computer executable instructions comprising computer code for:

determining whether a call alert extender function for the stationary personal telecommunication device is enabled for an incoming call to the stationary personal telecommunication device;

receiving, by a presence sensor, a user presence detect signal indicating that a potential user of the stationary personal telecommunication device is in physical proximity to the presence sensor, wherein the presence sensor and the stationary personal telecommunication device are physically separate, and wherein receiving the user presence detect signal indicates that the potential user requires an extended call alert count in order to reach the stationary personal telecommunication device prior to the personal telecommunication device switching to voicemail; and setting the extended call alert count associated with the call alert extender function for the mobile personal telecommunication device in response to the call alert extender function being enabled and user presence detect signal being received.

11. The computer program product of claim 10, wherein receiving the user presence detect signal includes detecting the presence of a unique identification (ID) signal of a mobile telecommunications device in operation in proximity to the stationary telecommunication device.

12. The computer program product of claim 10, wherein receiving the user presence detect signal includes detecting the presence of a computer use signal associated with present use of a computer in physical proximity to the stationary personal telecommunication device.

* * * * *